(12) United States Patent
Miller et al.

(10) Patent No.: US 9,768,431 B2
(45) Date of Patent: Sep. 19, 2017

(54) BATTERY PACK SEPARATOR

(71) Applicant: FORD GLOBAL TECHNOLOGIES, LLC, Dearborn, MI (US)

(72) Inventors: Daniel Miller, Dearborn, MI (US); Saravanan Paramasivam, South Lyon, MI (US); Dave Moschet, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 14/181,951

(22) Filed: Feb. 17, 2014

(65) Prior Publication Data
US 2015/0236325 A1  Aug. 20, 2015

(51) Int. Cl.
*H01M 2/18* (2006.01)
*H01M 10/6568* (2014.01)
*H01M 10/625* (2014.01)

(52) U.S. Cl.
CPC ......... *H01M 2/18* (2013.01); *H01M 10/6568* (2015.04); *H01M 10/625* (2015.04); *H01M 2220/20* (2013.01)

(58) Field of Classification Search
CPC ....................................................... H01M 2/18
USPC .......................................................... 429/50
See application file for complete search history.

(56) References Cited

U.S. PATENT DOCUMENTS

| | | | |
|---|---|---|---|
| 8,071,234 B2 | 12/2011 | Okada et al. | |
| 8,268,474 B2 | 9/2012 | Kim et al. | |
| 8,367,239 B2 | 2/2013 | Hermann | |
| 2007/0037051 A1 | 2/2007 | Kim et al. | |
| 2011/0162820 A1 | 7/2011 | Weber et al. | |
| 2012/0009455 A1 | 1/2012 | Yoon | |
| 2012/0107649 A1 | 5/2012 | Anderson et al. | |
| 2012/0177952 A1 | 7/2012 | Maguire et al. | |
| 2012/0298433 A1 | 11/2012 | Ohkura | |
| 2012/0328918 A1 | 12/2012 | Kim | |
| 2013/0071699 A1 | 3/2013 | Heise | |
| 2013/0252045 A1* | 9/2013 | Park | H01M 2/1016 429/82 |
| 2013/0273404 A1* | 10/2013 | Ochi | H01M 2/14 429/99 |
| 2013/0302653 A1 | 11/2013 | Pham et al. | |

* cited by examiner

*Primary Examiner* — Patrick Ryan
*Assistant Examiner* — Victoria Lynch
(74) *Attorney, Agent, or Firm* — Carlson, Gaskey & Olds, P.C.

(57) ABSTRACT

An example battery pack separator includes a spacer section and a vent section. The spacer section has a portion that is operative to fit between a first battery cell and a second battery cell along an axis. The portion has a perimeter. A vent section has an aperture that extends away from the axis outside the perimeter.

20 Claims, 11 Drawing Sheets

BATTERY PACK SEPARATOR

BACKGROUND

This disclosure relates generally to a battery pack and, more particularly, to a separator between battery cells of the pack. This separator provides a dielectric and a path for venting the battery cells.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), fuel cell vehicles, and battery electric vehicles (BEVs). A powertrain of an electric vehicle is typically equipped with a battery pack having battery cells that store electrical power for powering the electric machine. The battery cells may be charged prior to use. The battery cells may be recharged during a drive by regeneration braking or an internal combustion engine.

From time to time, fluid within the interiors of some types of battery cells, such as lithium ion battery cells, can undesirably expand. Confining the expanding fluid within the interiors of the battery cells can cause the battery cells to swell undesirably. Each battery cell is thus typically equipped with a vent.

In some examples, the vent is closed during operation. If fluid within the interior of the battery cell expands, the expanding fluid opens the vent. The open path provides a path for the expanding fluid to escape from the interior. The venting prevents the expanding fluid from swelling the battery cell.

Removing the vented fluid from the vehicle is often required so that, for example, the vented fluid does not enter a cabin of the vehicle. Providing a vent path to communicate and contain the vented fluid can require many components and complicated assembly steps.

SUMMARY

A battery pack separator according to an exemplary aspect of the present disclosure includes, among other things, a spacer section having a portion that is operative to fit between a first battery cell and a second battery cell along an axis. The portion has a perimeter. A vent section of the separator has an aperture that extends away from the axis outside the perimeter.

In another example of the foregoing separator, the spacer section provides portions of channels to carry coolant.

In another example of any of the foregoing separators, the vent section extends upwardly from a vertically uppermost side of the spacer section.

In another example of any of the foregoing separators, the vent section is positioned entirely outside the perimeter.

In another example of any of the foregoing separators, the separator includes an upper flange and a lower flange of the vent section, the upper flange extends in a first direction and the lower flange extends in a second direction opposite the first direction. The upper flange is to fit over a lower flange of a first adjacent separator. The lower flange is to fit beneath an upper flange of a vent section of second adjacent separator.

In another example of any of the foregoing separators, the upper flange and the lower flange have c-shaped cross sectional profiles.

In another example of any of the foregoing separators, the upper flange of the vent section is configured to directly contact the lower flange of the first adjacent separator, and the lower flange of the vent section is configured to directly contact the upper flange of the second adjacent separator.

In another example of any of the foregoing separators, at some axial section of the vent conduit, the vent section forms less than one hundred percent of a circumferential perimeter of the vent conduit.

In another example of any of the foregoing separators, at some axial section of the vent conduit, the vent section forms a portion of a circumferential perimeter of the vent conduit and a surface of the battery cell forms the remaining portions of the circumferential perimeter.

In another example of any of the foregoing separators, at some section of the vent conduit, the vent section forms an entire circumferential perimeter of the vent conduit.

In another example of any of the foregoing separators, the separator includes a coolant flow path of the spacer section and a vent conduit of the vent section. The coolant flow path is operative to communicate coolant within a first plane between the battery cell and an adjacent battery cell. The vent conduit is operative to communicate vented battery cell fluid within a second plane that is transverse to the first plane.

A battery pack according to another exemplary aspect of the present disclosure includes, among other things, a battery cell having a vent. A first separator has a spacer section on a first side of the battery cell. A second separator has a spacer section on an opposing, second side of the battery pack. The first separator includes a vent section extending over the vent overlap with a vent section of the second separator.

In another example of the foregoing battery pack, the first separator overlaps with the second separator at a laterally outer position.

In another example of any of the foregoing battery packs, the first separator overlaps with the second separator at a median of the battery cell.

In another example of any of the foregoing battery packs, the vent sections of the first separator and the second separator extend outside a perimeter of the battery cell to provide a vent path.

In another example of any of the foregoing battery packs, the spacer section of the first separator is configured to communicate a coolant fluid, and the vent section is configured to communicate another fluid from the vent.

In another example of any of the foregoing battery packs, the coolant fluid is air.

A method of battery cell venting according to yet another exemplary aspect of the present disclosure includes, among other things, overlapping some of a separator with an axially adjacent separator in a battery pack to cover a vent of a battery cell.

In another example of the foregoing method, the method includes communicating coolant between adjacent battery cells using a portion of the separator that is between adjacent battery cells.

In another example of any of the foregoing methods, the method includes, among other things, communicating fluid from an interior of a battery cell of the battery pack using the separator, the separator having a vent section extending outside a portion of the separator that is between axially adjacent battery cells.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
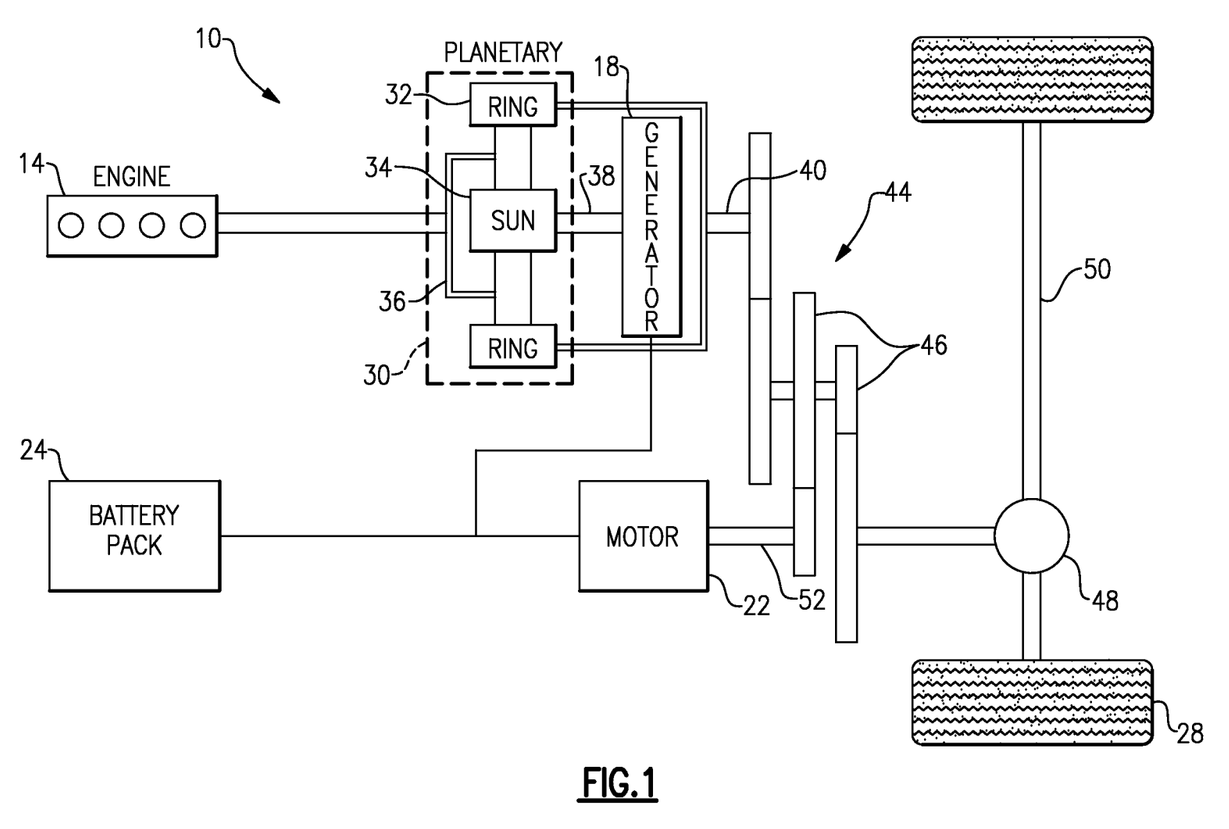
FIG. 1 schematically illustrates an example electric vehicle powertrain.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electric vehicle battery assembly. The battery pack 24 may have the form of a high voltage battery that is capable of outputting electrical power to operate the motor 22 and the generator 18. Other types of energy storage devices and/or output devices can also be used with the electric vehicle having the powertrain 10.

Figure 2:
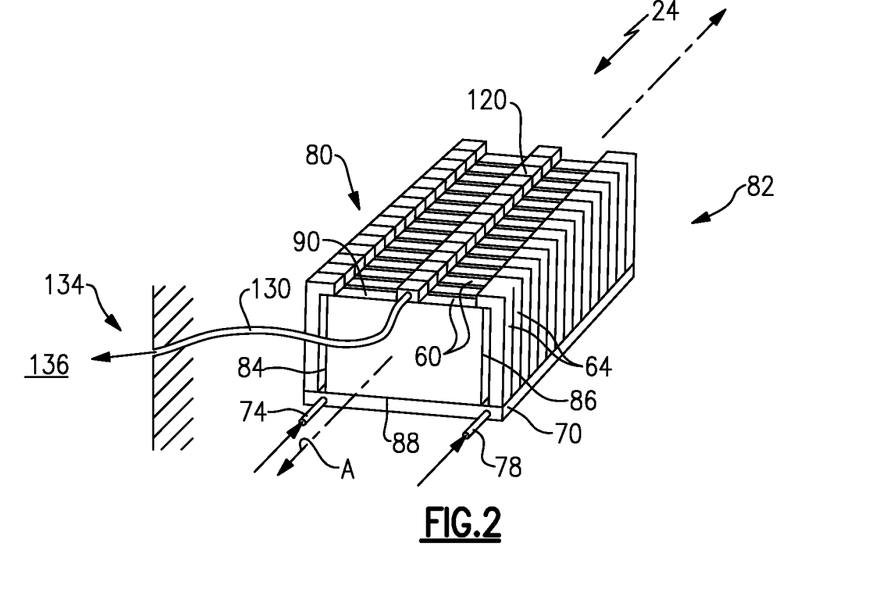
FIG. 2 shows a highly schematic view of the battery pack of FIG. 1.
Figure 3:
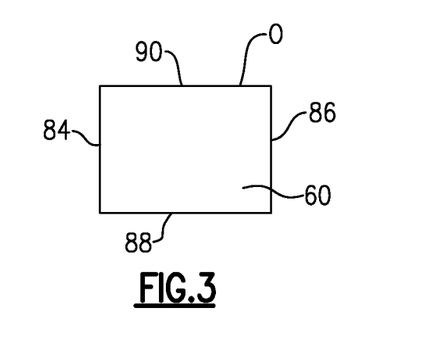
FIG. 3 shows a schematic side view of a cell of the battery pack of FIG. 2.

Referring now to FIGS. 2 and 3, the example battery pack 24 includes a plurality of battery cells 60 and a plurality of separators 64 along an axis A. The separators 64 can address isolation of the battery cells 60 to ground. In this example, each of the cells 60 is separated from an adjacent cell by one of the separators 64.

The example battery pack 24 is cooled via liquid coolant communicated through a cold plate 70. The cells 60 and separators 64 are placed on the cold plate 70. Liquid coolant moves through an inlet 74 to a coolant path within the cold plate 70. The liquid coolant circulates through the coolant path to absorb thermal energy from the cells 60. The liquid coolant exits from the cold plate 70 at an outlet 78.

The battery pack 24 has a first lateral cell side 80 and a second lateral cell side 82. The first lateral cell side 80 opposes the second lateral cell side 82. The battery cells 60 extend laterally from a median at the axis to laterally outer cell sides 84 and 86.

The cells 60 further have a vertically lower cell side 88 and a vertically upper cell side 90. The vertically lower side 88 rests on the cold plate 70 in this example. Generally, the sides 80, 82, 88, and 90 define an outer profile O of the cells 60.

Referring now to FIGS. 4-10 with continuing reference to FIG. 2, an example separator 64' includes a spacer section 92 and a vent section 94. The spacer section 92 includes a portion P (FIG. 5) that is within an outer perimeter of the battery cells 60. In this example, the portion P is the portion of the spacer section 92 that is axially between the battery cells 60 within the battery pack 24. The outer profile of the portion P generally aligns with an outer profile of the battery cells 60, such as the outer profile O of the cell 60 shown in FIG. 3. Notably, at least a portion of the vent section 94 extends outside the perimeter P.

Figure 4:
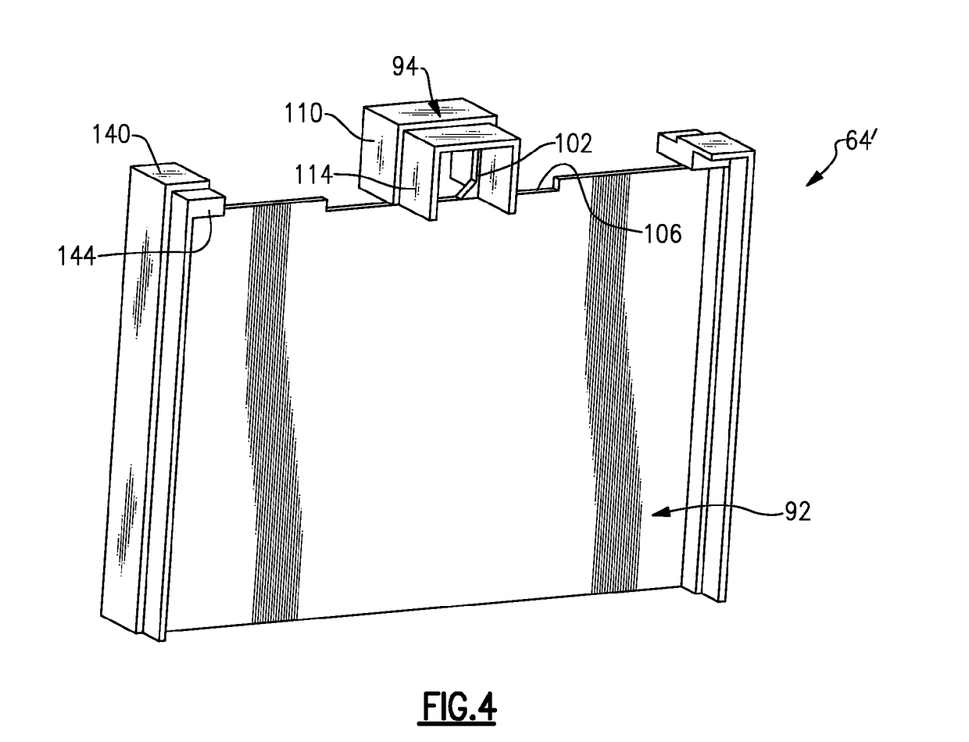
FIG. 4 shows a perspective view of an example separator used within the battery pack of FIG. 2.
Figure 5:
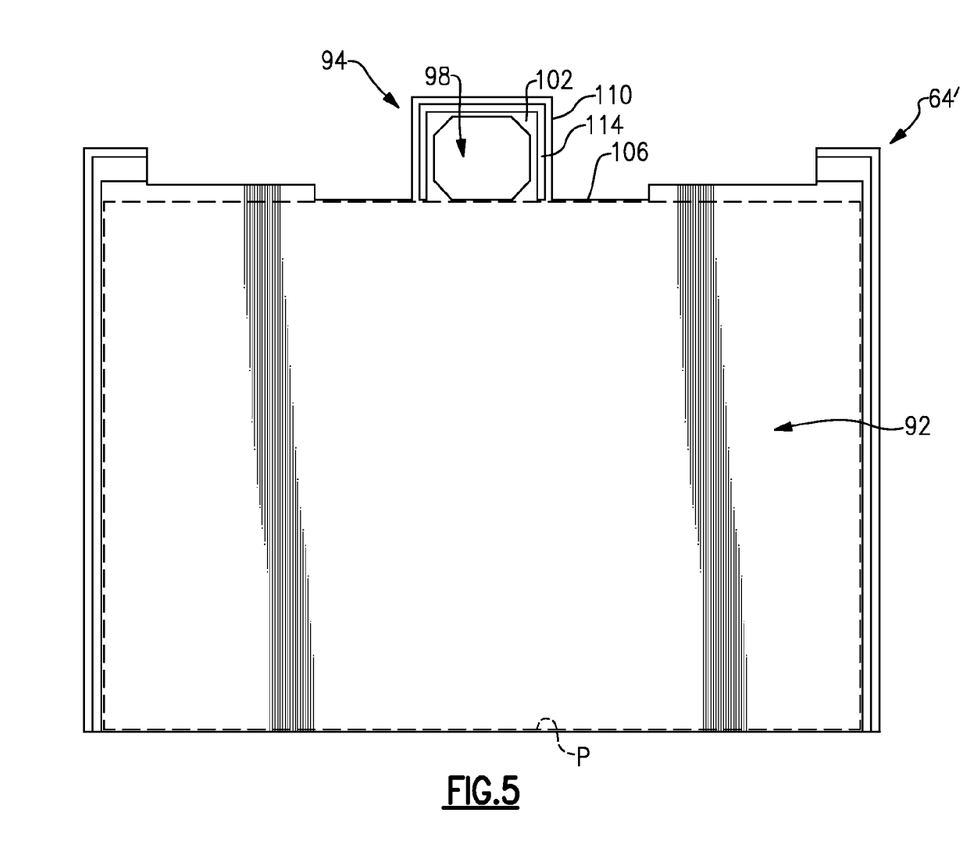
FIG. 5 shows a front view of the separator of FIG. 4.

The vent section 94 has an aperture 98. At least some of the aperture 98 is also outside the perimeter P. In this example, the entire aperture 98 is outside the perimeter P.

The example aperture 98 is within a wall 102. The wall 102 extends upwardly from an upwardly facing side 106 of the spacer section 92.

Figure 6:
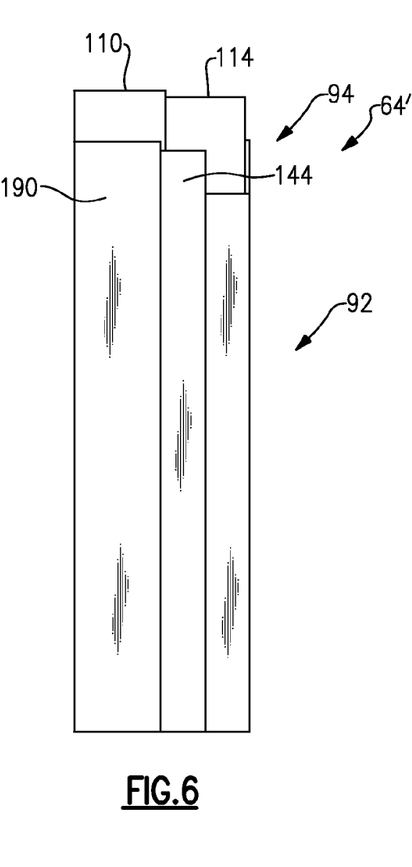
FIG. 6 shows a side view of the separator of FIG. 4.

An upper flange 110 extends axially in a first direction from the wall. A lower flange 114 extends axially in a second direction along the axis A from the wall 102. The first direction is opposite the second direction. The upper flange 110 and the lower flange 114 each have c-shaped cross sectional profiles in this example that are open toward the axis A.

Figure 7:
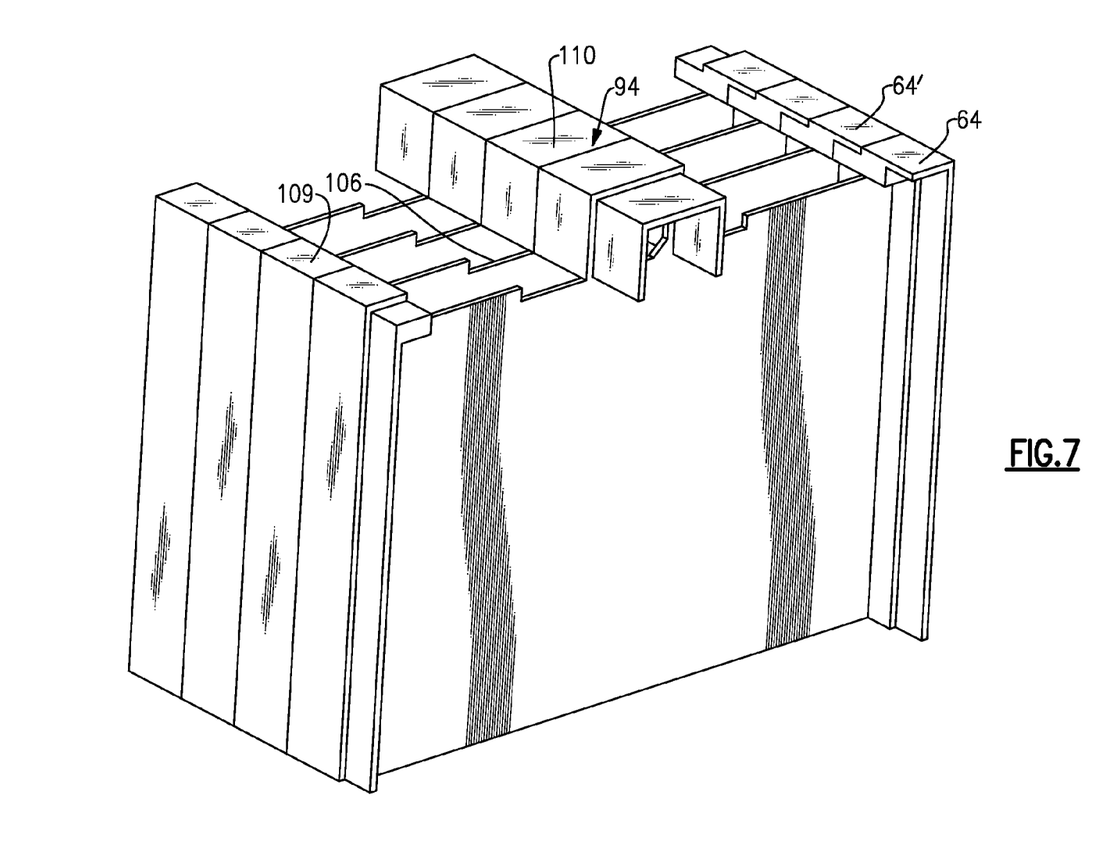
FIG. 7 shows the separator of FIG. 4 interfacing with adjacent separators.
Figure 7A:
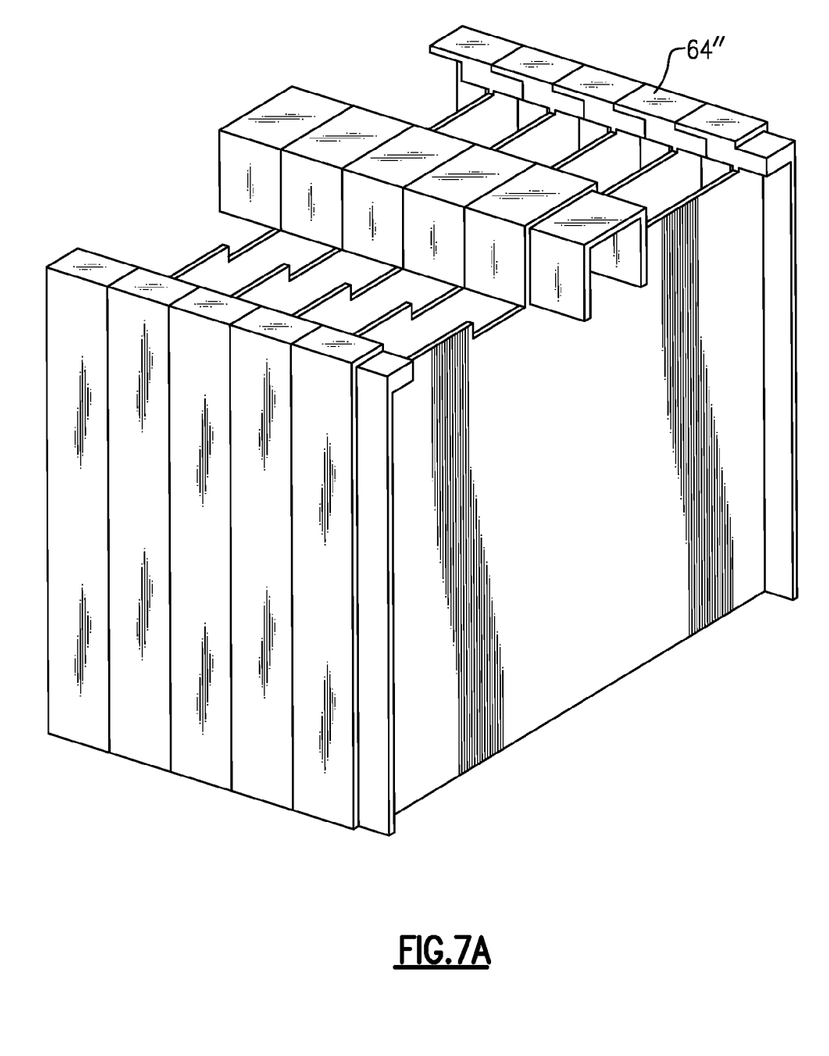
FIG. 7A shows another example separator interfacing with adjacent separators.
Figure 8:
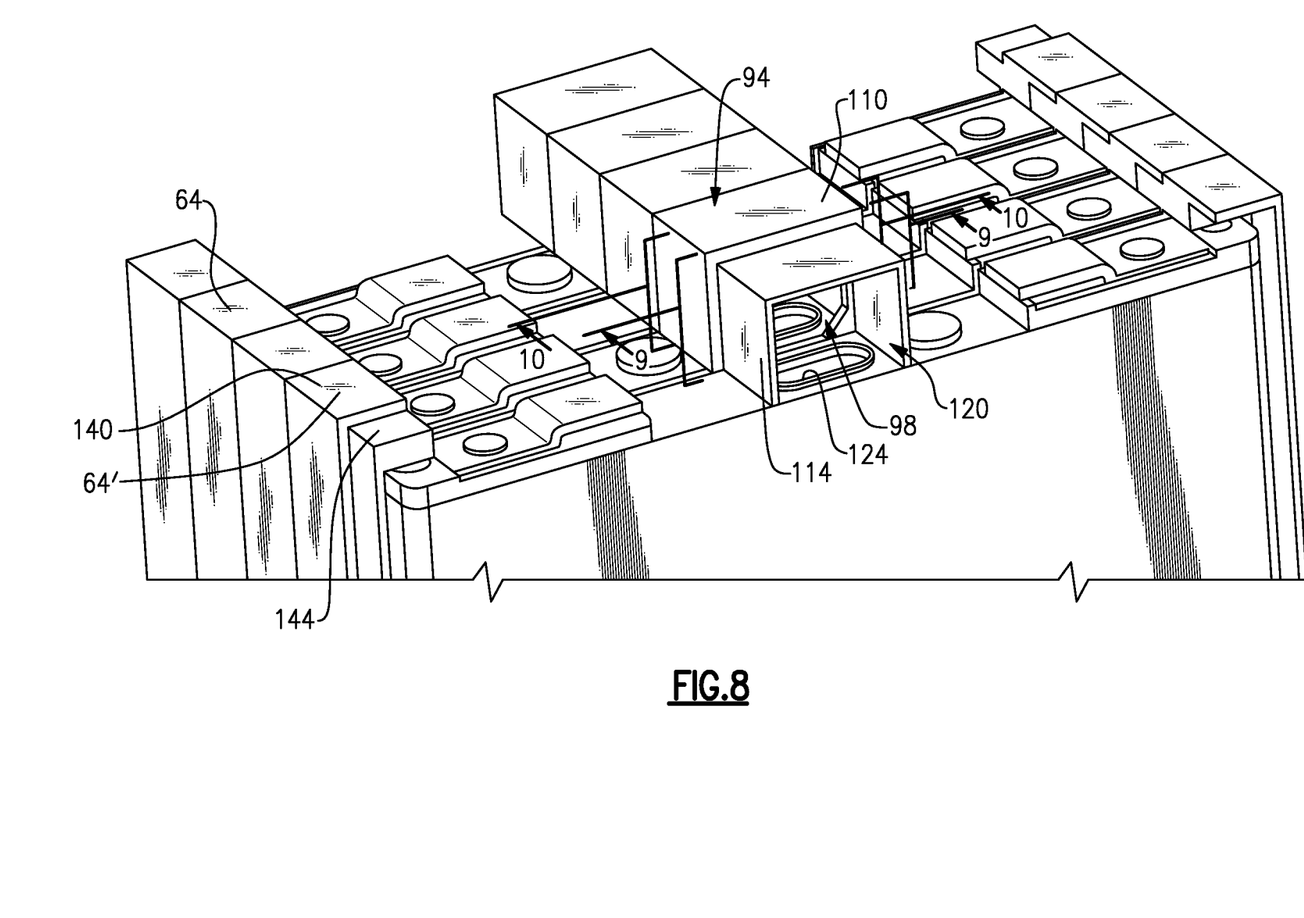
FIG. 8 shows the close-view of the FIG. 7 when the interfacing separators are in the battery pack of FIG. 2.

The shape of other separators 64 within the battery pack 24 mimics the shape of the separator 64' (FIGS. 7 and 8).

When assembled within the battery pack 24, the upper flange 110 of the separator 64' fits over the lower flanges 114 of an axially adjacent one of the separators 64. Due to the overlapping relationship, the vent section 94 of the separator 64' is said to shiplap or shingle with the vent sections 94 of adjacent separators 64. In some examples, the vent section 94 of the separator 64' may interface with an adjacent vent section via a tongue and groove interface. When assembled, the separator 64' is interlocked with axially adjacent separators 64

The shiplapping of the flanges 110 and 114 of adjacent vent sections 94 enables the separators 64 within the battery pack 24 to provide a vent conduit 120 extending along the axis A. The flanges 110 and 114 directly contact each other in this example.

Figure 9:
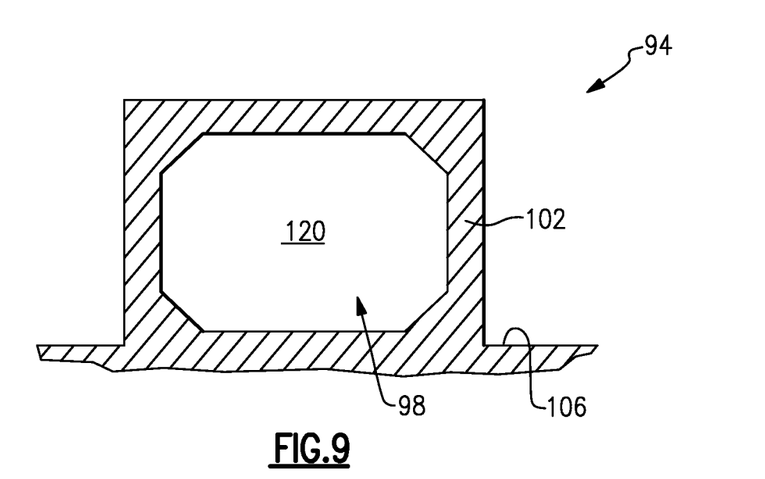
FIG. 9 shows a section view at line 9-9 in FIG. 8.

At the section of the vent conduit 120 shown in FIG. 9, three sides of the vent conduit 120 are established by the vent section 94. More specifically, the three sides are provided by the lower flange 114 of the vent section 94. At this axial position, the remaining fourth side of the vent conduit 120 is established by the vertically upper cell side 90 of one of the cells 60. Thus, the vent section 94, in this example, forms less than one hundred percent of a circumferential perimeter of the vent conduit 120. The section shown in FIG. 9 is substantially perpendicular to the axis A.

Figure 10:
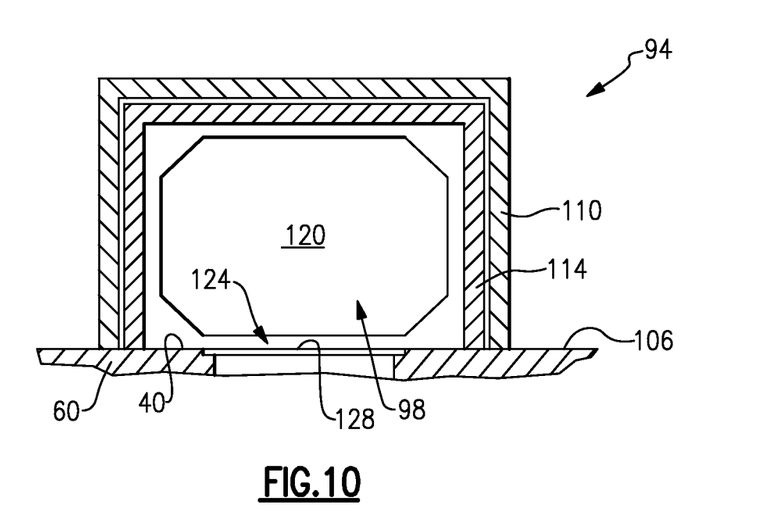
FIG. 10 shows a section view at line 10-10 in FIG. 8.

At the section shown in FIG. 10, all sides of the vent conduit 120 are established by the vent section 94. More specifically, the vent conduit 120 at this axial position is provided entirely by the aperture 98. The section shown in FIG. 10 is cut through the vent conduit 120 substantially perpendicular to the axis A.

The battery cells 60 include vent openings 124 within the outwardly facing surface. The vent openings 124 are covered by a membrane 128 during normal operation of the battery pack 24. The vent openings 124 are at a medial position of the battery cells 60. The vent portions 94 of the separators 64 are aligned with the vent openings 124 at the medial position.

Periodically, gases within the battery cells 60 may expand and require venting. In this example, the expansion of these gases forces open the membrane 128 providing an open path for the gases to move to the vent conduit 120.

These flow axially along the vent conduit 120 into another conduit 130 extending to the battery pack 24. The exhaust gas can then move through the conduit 130 to an exhaust location 134, which is outside the vehicle having the powertrain 10 in this example. The vent conduit 120 thus provides part a flow path for gases from inside the battery cells 60 to be communicated in a manner to a desired exhaust location outside the vehicle. The desired exhaust location is atmosphere 136 in this example.

The lateral sides of the separator 64 include additional shiplapped interfaces, which interlock stabilize the overall battery pack structure. In this example, one of the laterally outer sides of the separator 64 includes an upper flange 140 extending in a first direction along the axis A, and a lower flange 144 extending in a second direction along the axis A. The first direction is opposite to the second direction.

In this example, the other one of the lateral sides of the separator 64 includes an upper flange extending in the second direction and a lower flange extending in the first direction.

When the separators 64 are assembled within the battery pack 24, the upper flanges 140 overlap the lower flanges 144 of an adjacent separator 64. The separator 64' thus overlaps or shiplaps with an axially adjacent one of the separators 64 at laterally outer edges. Further, portions of the separator 64' at the laterally outer edges are overlapped by another axially adjacent one of the separators 64.

In the separator 64' of FIG. 7, the upper and lower flanges of the other lateral side of the separator 64 overlap or shiplap with axially adjacent separators in a similar manner, but in opposite axial directions. By contrast, in the separator 64" of FIG. 7A, the upper and lower flanges of the other lateral side of the separator 64" overlap or shiplap with axially adjacent separators in a similar manner and in the same axial direction.

Notably, the flanges 140 and 144 are portions of the separator 64 that extend across one of the vertically upper cell sides 90 to overlap with the adjacent separator. Also, the flanges 110 and 112 of the vent section 94 are portions of the separator 64 that extend across the one of the vertically upper cell sides 90.

Figure 11:
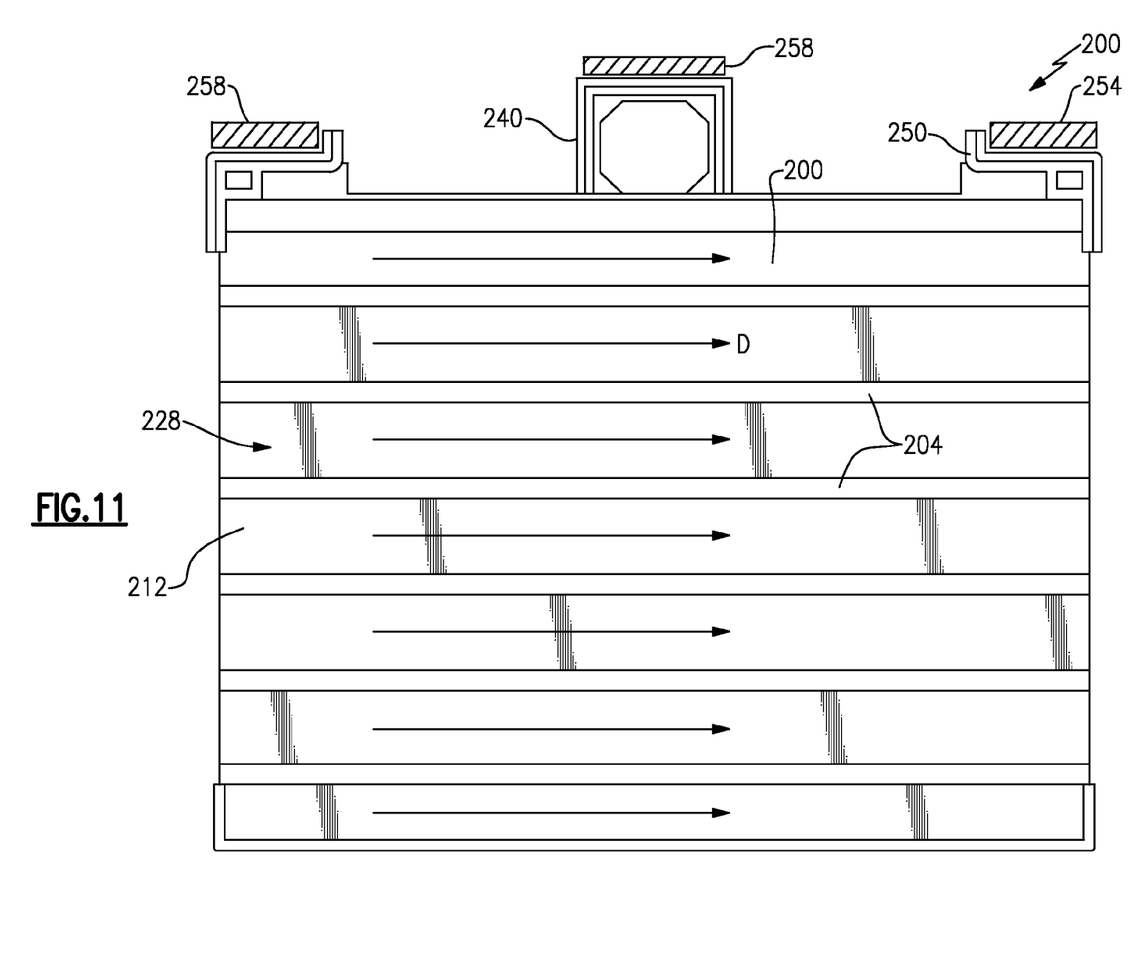
FIG. 11 shows a front view of another example separator.
Figure 12:
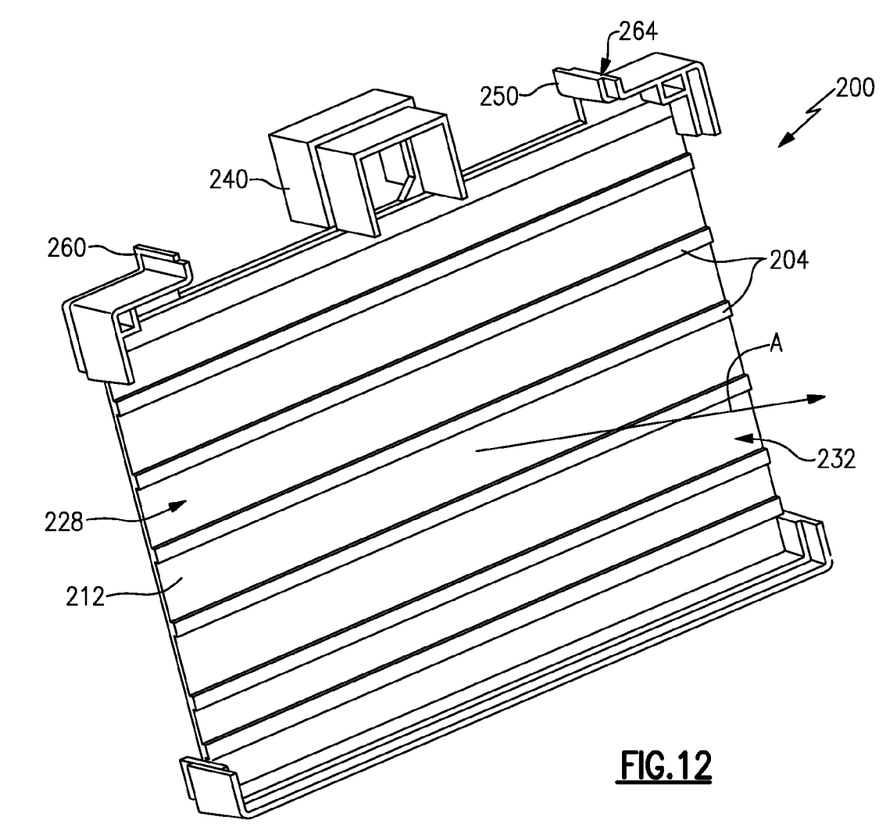
FIG. 12 shows a perspective view of a portion of the separator of FIG. 11.

FIGS. 11 and 12 show another example separator 200, 200' for use in an air-cooled battery packs. The separator 200 is used to separate battery cells having vents.

In this example, ribs 204 extend axially from opposing sides of a separator section 212. The ribs 204 provides portions of coolant channels 228 to communicate air between adjacent battery cells. In this example, the cooling channels 228 are established on three sides by the separators 200, 200' and on a remaining side by one of the battery cells.

During operation, air moves into the cooling channels 228 from an inlet plenum on a first lateral side of the separator 200 and exits from the cooling channels 228 into an outlet plenum on an opposing second lateral side of the separator. The air carries thermal energy from the battery cells when moving through the cooling channels 228 to the outlet plenum 236. This cools the battery pack.

As with the separators 64 of FIGS. 2-10, the separator 200 includes vent sections 240 outside a perimeter of the cells, and the separator section 212 inside the perimeter of the cells. The vent sections 240 provide portions of respective vent conduits at least partially outside the perimeter of the battery cells. The example vent sections 240 are aligned with a vent of the battery cells.

In some examples (not shown), at one of the laterally outer edges, the shiplapped portions of the separators 200 can provide portions of the inlet plenum and, at the other laterally outer edge, the shiplapped portions of the separator 200 can provide a portion the outlet plenum.

The vent conduit of the separator 200 communicates vented battery cell fluid generally in a direction aligned with an axis A along a first plane. Air cooling the battery pack moving through the coolant channels 228 from the inlet plenum to the outlet plenum flows in a direction D within a second plane. The second plane is transverse to the first plane in this example.

In this example, The laterally outer edges of the separator 200 include upwardly extending flanges 250. When the separator 200 is secured within a battery pack, the flanges 250 help to stabilize side rail isolators 254. The vent section 240 could also include upwardly extending flanges to hold a rail 258. The flanges 250 shiplap with flanges of axially adjacent separators within the battery pack. The flanges 250 may further include a tongue 260 that fits within a groove 264.

Figure 13:
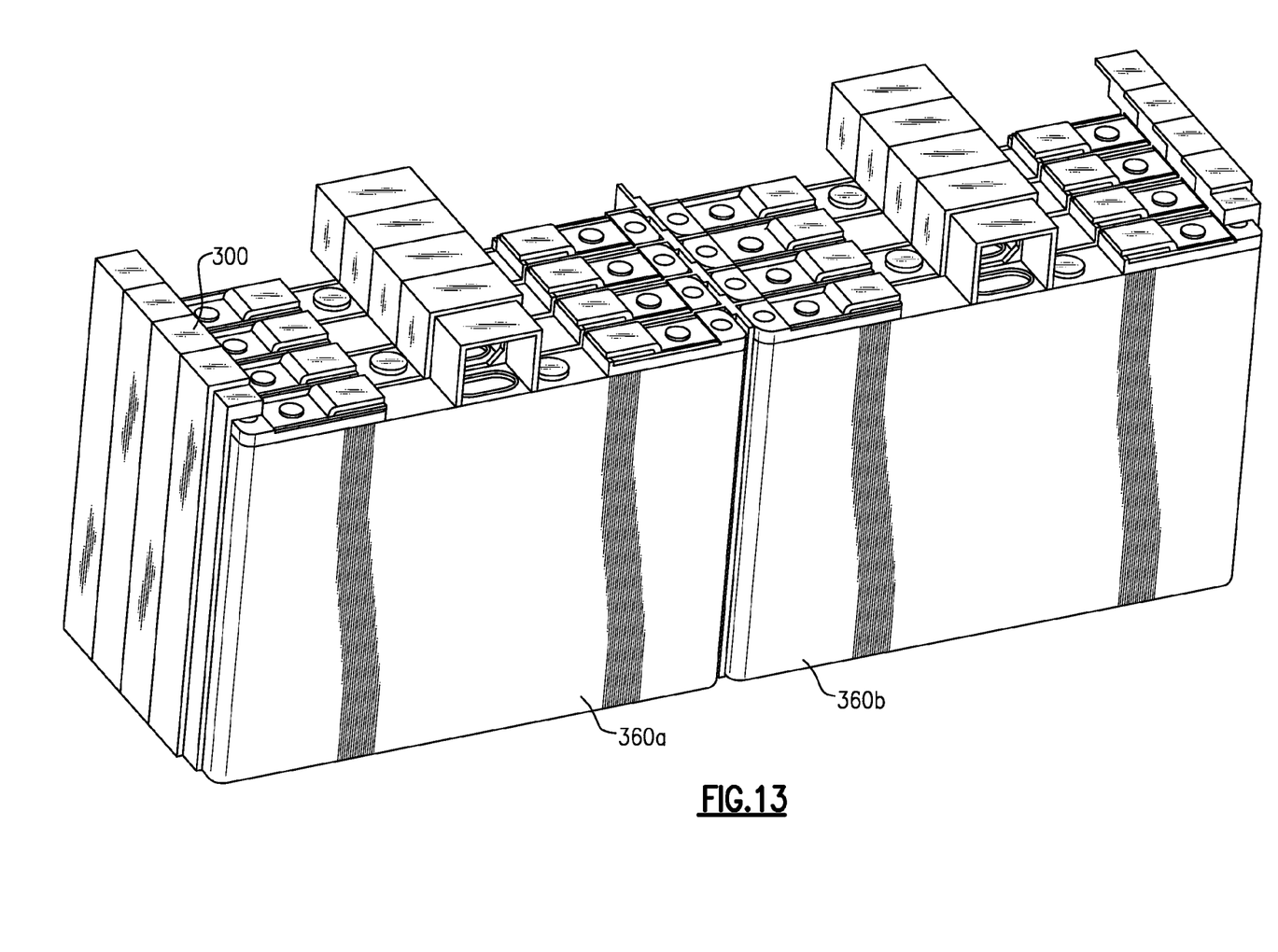
FIG. 13 shows yet another example separator interfacing with other separator within a battery pack.

Referring now to FIG. 13 yet another example separator 300 can be used to separate adjacent arrays of battery cells 360a and 360b. In this example, a single separator 300 includes two distinct vent portions and two distinct vent portions as shown.

Features of some of the disclosed examples include providing separators that shiplap with axially adjacent separators across a battery cell. The shiplap stabilized the assembly and can provide a conduit for venting battery cells. Another feature is a vent conduit provided by a separator.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A battery pack separator, comprising:
   a spacer section having a portion that is operative to fit between a first battery cell and a second battery cell along an axis, the portion having a perimeter; and
   a vent section having an aperture that extends away from the axis outside the perimeter, and an overlap portion configured to extend axially from a first axial side of a battery cell vent to an opposing, second axial side of the battery cell vent such that the overlap portion extends axially across the entire battery cell vent to axially overlap with an overlap portion of a vent section of an axially adjacent battery pack separator.

2. The separator of claim 1, wherein the spacer section provides portions of channels to carry coolant.

3. The separator of claim 1, wherein the vent section extends upwardly from a vertically uppermost side of the spacer section.

4. The separator of claim 1, wherein the vent section is positioned entirely outside the perimeter.

5. The separator of claim 1, comprising an upper flange and a lower flange of the vent section, the upper flange extending in a first direction and the lower flange extending in a second direction opposite the first direction, the upper flange to fit over a lower flange of a first adjacent separator, the lower flange to fit beneath an upper flange of a vent section of the second adjacent separator.

6. The separator of claim 5, wherein the upper flange of the vent section is configured to directly contact the lower flange of the first adjacent separator, and the lower flange of the vent section is configured to directly contact the upper flange of the second adjacent separator.

7. The separator of claim 5, wherein the lower flange provides a portion of an outer perimeter of a vent conduit, the vent conduit to selectively communicate fluid from an interior of a battery cell to an exhaust location.

8. The separator of claim 7, wherein, at some axial section of the vent conduit, the vent section forms less than one hundred percent of a circumferential perimeter of the vent conduit.

9. The separator of claim 7, wherein at some axial section of the vent conduit, the vent section forms an entire circumferential perimeter of the vent conduit.

10. The separator of claim 1, comprising a coolant flow path of the spacer section and a vent conduit of the vent section, the coolant flow path operative to communicate coolant within a first plane between the battery cell and an adjacent battery cell, the vent conduit operative to communicate vented battery cell fluid within a second plane that is transverse to the first plane.

11. A battery pack, comprising:
    a battery cell having a vent;
    a first separator having a spacer section on a first side of the battery cell; and
    a second separator having a spacer section on an opposing, second side of the battery cell, the first separator including a vent section extending from the first side to the second side over the entire vent and over a vent section of the second separator.

12. A battery pack, comprising:
    a battery cell having a vent;
    a first separator having a spacer section on a first side of the battery cell; and
    a second separator having a spacer section on an opposing, second side of the battery cell, wherein the first separator includes a vent section extending over the vent to overlap with a vent section of the second separator, wherein the first separator overlaps with the second separator at a laterally outer position such that a portion of the first separator is beneath a portion of the second separator at the laterally outer position.

13. The battery pack of claim 11, wherein the first separator overlaps with the second separator at a median of the battery cell.

14. The battery pack of claim 11, wherein the vent sections of the first separator and the second separator extend outside a perimeter of the battery cell to provide a vent path, wherein the first separator includes no more than one spacer section, and the second separator including no more than one spacer section.

15. The battery pack of claim 14, wherein the spacer section of the first separator is configured to communicate a coolant fluid, and the vent section is configured to communicate another fluid from the vent.

16. The separator of claim 1, wherein the overlapping portion extends axially from a portion of the vent section that provides the aperture.

17. The separator of claim 5, wherein the upper flange of the vent section shiplaps with the lower flange of the first adjacent separator, and the lower flange of the vent section shiplaps with the upper flange of the second adjacent separator.

18. The separator of claim 1, comprising an upper side flange at a first outer lateral side of the separator, and a lower side flange at an opposing, second outer lateral side of the separator, the upper side flange configured to overlap a lower side flange of the axially adjacent separator, the lower side flange configured to underlap an upper side flange of the axially adjacent separator, the upper side flange and the lower side flange spaced from the vent section.

19. The battery pack of claim 11, wherein the first separator overlaps with the second separator at a first laterally outer position spaced from the vent section, and the second separator overlaps with the first separator at a second laterally outer position that is opposite the first laterally outer position spaced from the vent section.

20. The battery pack of claim 12, wherein the laterally outer position is a first laterally outer position, and the second separator overlaps with the first separator at a second laterally outer position that is opposite the first laterally outer position.

* * * * *

UNITED STATES PATENT AND TRADEMARK OFFICE
CERTIFICATE OF CORRECTION

PATENT NO. : 9,768,431 B2
APPLICATION NO. : 14/181951
DATED : September 19, 2017
INVENTOR(S) : Daniel Miller, Saravanan Paramasivam and Dave Moschet Page 1 of 1

It is certified that error appears in the above-identified patent and that said Letters Patent is hereby corrected as shown below:

In the Claims

In Claim 10, Column 8, Line 2; after "first plane between" replace "the battery cell" with --the first battery cell--

In Claim 10, Column 8, Line 3; before "the vent conduit" replace "an adjacent battery cell" with --the second battery cell--

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*